Nov. 8, 1927.

C. H. WILLIAMS 1,648,174

LUBRICATING SYSTEM

Filed April 28, 1923

Inventor:
Charles H. Williams
Emery, Booth, Janney & Varney
Attys.

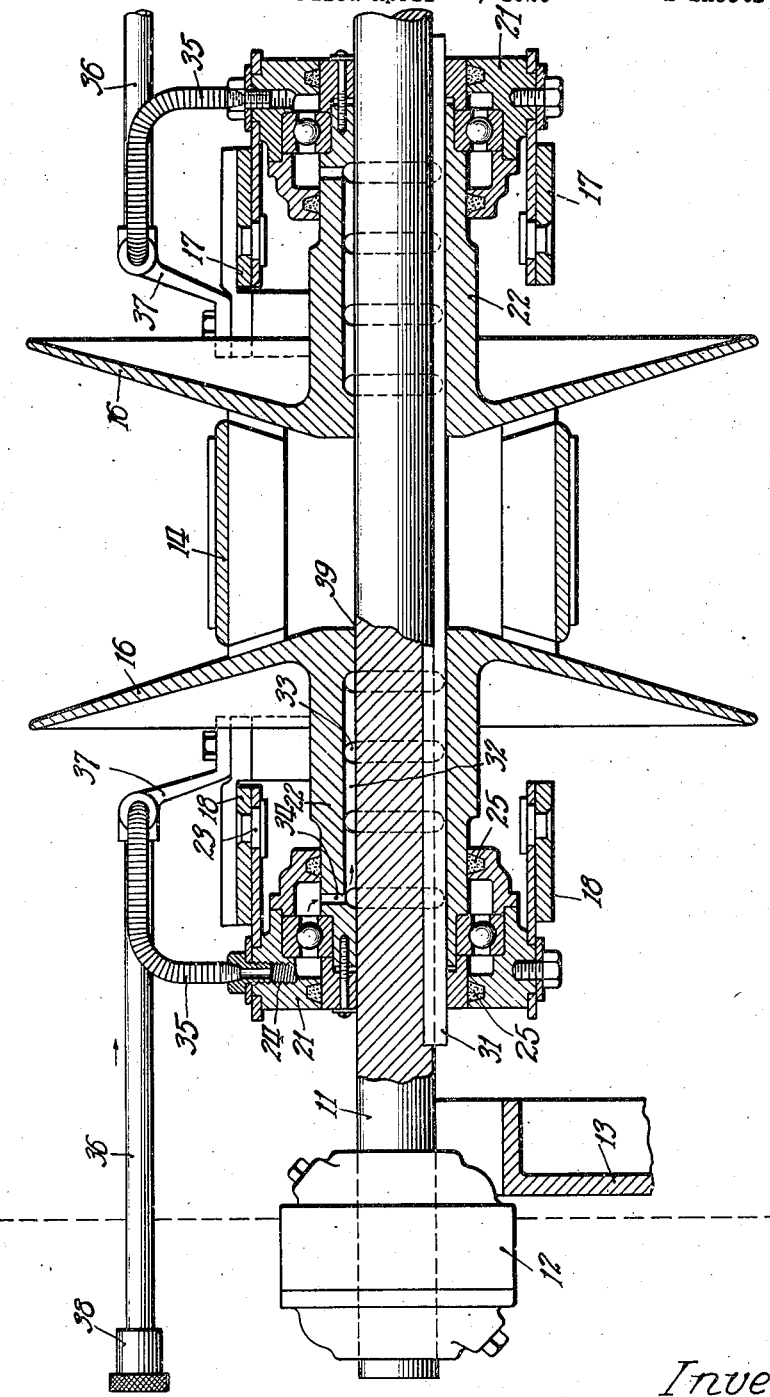

Patented Nov. 8, 1927.

1,648,174

UNITED STATES PATENT OFFICE.

CHARLES H. WILLIAMS, OF INDIANAPOLIS, INDIANA, ASSIGNOR TO THOMAS L. GREEN, OF INDIANAPOLIS, INDIANA.

LUBRICATING SYSTEM.

Application filed April 28, 1923. Serial No. 635,180.

The invention relates to lubricating systems for variable speed transmissions and other mechanisms in which certain problems involving lubrication arise.

Among other objects, the invention is intended to provide an improved system of lubrication for mechanisms of this character, which is reliable and will minimize the attention and care necessary to maintain the operating efficiency of the mechanism.

The invention consists in the novel constructions, arrangements and combinations, hereinafter described and claimed, for carrying out the above stated objects and such other objects as will appear from the following description.

The nature of the invention may be best explained by reference to an illustrative mechanism comprising a certain type of variable speed transmission having a lubricating system embodying the invention. Such construction is illustrated in the accompanying drawings.

In said drawings:

Fig. 2 is a vertical cross-section taken along the line 2—2 of Fig. 1.

Figure 1:
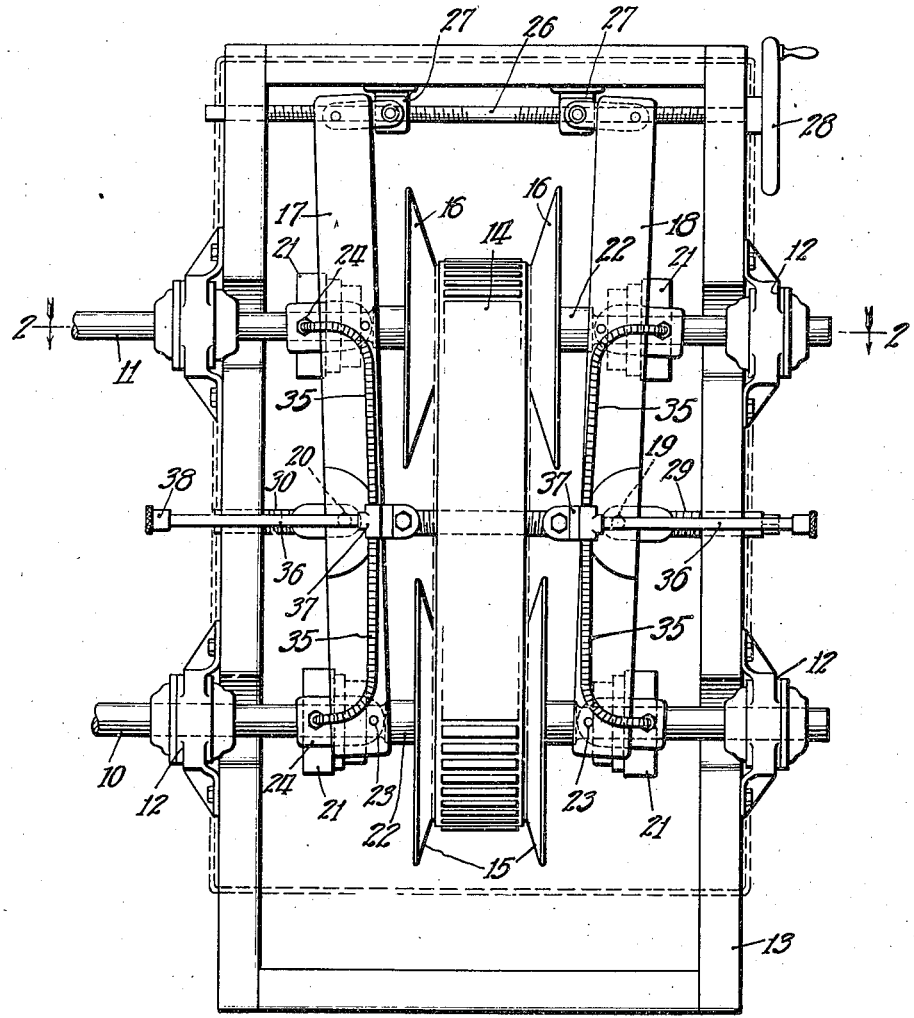
Fig. 1 is a plan view of the mechanism.

The illustrative mechanism comprises a typical variable speed transmission, the general construction and characteristics of which form no part of the present invention but will be briefly described to afford a better understanding of the illustrative lubricating system applied to this transmission. As will later appear, the inventive lubricating system is not limited in its application to the specific mechanism herein illustrated.

The transmission comprises a pair of main shafts 10 and 11, one to which power is applied, and the other from which power is taken. Both shafts are supported within suitable ball bearings 12 mounted on the frame 13. Power is transmitted from one shaft to the other by a flexible friction belt 14 of suitable construction, which travels between pairs of conical friction disks 15 and 16, slidably keyed or splined to the shafts 10 and 11 respectively. Speed variation is effected by simultaneously varying the distance between the respective pairs of disks, thereby varying proportionally the effective driving radii of the belt in passing over the disks. The relative adjustment of the disks and shaft is effected by pairs of levers 17 and 18 fulcrumed at 19 and 20 respectively between shafts 10 and 11.

The pairs of levers 17 and 18 respectively are connected with the power-transmitting elements or disks through suitable bearing members such, for example, as thrust ball bearings 21 mounted on the hubs 22 of the power-transmitting elements. The levers are suitably connected with the bearings by a pivotal connection, for example, as at 23, with the members 24 which project from the housings of the bearings.

The housings of the bearings are provided with suitable packings 25 which prevent the escape of lubricant and exclude dust and foreign matter.

The pairs of levers 17 and 18 are adjusted by a double pitched screw 26 mounted near one end of the frame 13 and carrying screw blocks 27 pivotally connected to the levers respectively. The rotation of the screw 27 by the hand wheel 28 moves the levers together or apart and effects a proportional adjustment of the power-transmitting elements to vary the speed ratio. The fulcrum or pivot points 19 and 20 of the levers are mounted for adjustment by right and left screw threads 29 and 30 on a transverse screw shaft which move the fulcrum points in or out to adjust the belt tension. The thrust upon the power-transmitting elements 15 and 16 is carried by the respective bearings 21.

The driving connection between the power transmitting elements and the shafts 10 and 11 is effected by a spline connection 31 which permits a longitudinal adjustment of the power-transmitting elements on the shaft.

Lubrication of this and other mechanisms is effected by supplying the lubricant to a non-rotating part of the mechanism, such as the housing of a bearing element. From this point the lubricant is conducted by suitable means, such as conduits, to the various bearing surfaces requiring lubrication.

In the present mechanism, lubrication of the shaft bearing surfaces associated with the power-transmitting elements, is effected by a supply of lubricant to a suitable passage within the bearing surface of the hub 22 of the disks. These passages may comprise, as illustrated, a longitudinal groove 32 and one or more lubricating grooves 33 connecting therewith and extending from one side of the spline or key 31 around the bearing surface to the other side of the key. The slight play between the bearing surfaces of the disk and the shaft, during operation, assists in effectively distributing lubricant throughout the bearing surfaces.

Lubricant is supplied to the mechanism through a non-rotating part such for example as the housing of one or more of the bearing members 21. From the interior of these bearings, the lubricant may be conducted in any suitable manner to the moving bearing surfaces. This may be conveniently effected, for example, by providing a passage 34 through the hub of the disk which communicates with the longitudinal groove 32 in the bearing surface.

Lubricant may be supplied to the interior of the bearings 21 preferably through a conduit which extends from some convenient point from which the lubricant may be supplied and connects with the bearing housing.

In the illustrative construction, the respective bearings 21 are provided with conduits 35, communicating with the interior, those of each side communicating with a common supply conduit 36. The inner end of the supply conduit 36 is supported near the respective pivot points 19 and 20 of the levers, preferably on some part of the structure which does not oscillate with the levers. Suitable couplings 37 are provided for connecting with the respective conduits 35. Preferably, the conduits 35 are arranged to permit an amount of flexibility necessary to allow the relative adjustment of the disks. For this purpose these conduits may be either flexible tubes or systems of piping having suitable couplings which provide the desired flexibility. The flexing of the conduits to permit an adjustment of the levers 17 and 18 takes place, in the arrangement shown, between the couplings 37 and the connection of the respective conduits 35 with the housings of the bearings 21.

The outer ends of the supply conduits 36 are provided with suitable appliances 38 by means of which lubricant may be supplied. These appliances may comprise either grease cups or connections for grease guns or the like.

The foregoing lubricating system it will be observed, does not interfere with the adjustment of the power-transmitting elements on a shaft. On the contrary, these may be adjusted to any degree desired without impairing the efficiency of the lubricating system. The lubricant supplied to the respective supply conduits 36 not only lubricates the bearings 21 but, by passing through the passage in the hub disk, lubricates the shaft bearing surfaces.

Although only the arrangement with respect to shaft 11 is specifically illustrated in Fig. 2, it will be understood that a similar lubricating arrangement is provided for shaft 10.

The improved system of lubrication is well suited for use in connection with mechanisms such as variable speed transmissions which it is desirable to enclose for the sake of protection. In many constructions in which variable speed transmissions and other mechanisms requiring adjustment are employed, it is highly desirable to enclose completely such mechanisms to afford protection against dust or moisture. Such an arrangement is particularly desirable in connection with machines which handle pulverized or dusty materials as, for example, a biscuit-cutting machine in which the accumulation of dust and flour on the moving parts makes it difficult to maintain satisfactory operating efficiency. For example, the illustrative construction may be completely enclosed, or to any extent desired, by a protective casing illustrated diagrammatically in dotted lines in Figs. 1 and 2. The respective supply conduits 36 project through the sides of the protective enclosure, thus readily permitting the supply of lubricant to the interior bearing surfaces.

It is not practical, however, to enclose this and other mechanisms if they require relatively frequent inspection or attention. Unless the mechanism will operate efficiently for long periods of time without attention or the necessity of replacement of parts, the protective enclosure of such parts involves numerous disadvantages which often outweigh the advantages to be gained by protective enclosure. For example, unless the parts of the illustrative variable speed transmission can be efficiently lubricated from the exterior and unless this mechanism will operate efficiently and reliably for long periods of time without serious wear or without attention to the parts within the casing, it is not practical to enclose such mechanism.

Insufficient or faulty lubrication resulting from lack of attention or otherwise, causes wear, rusting and sticking of parts, which increase the danger of interruption of operation.

In the illustrative construction, although the adjustment of the power-transmitting elements on the shaft often remains the same for long periods of time, the bearing surfaces are effectively lubricated and freezing or rusting of the hubs of the disks to the shafts is prevented. Moreover the certainty of adequate lubrication by means of the system above described permits a much closer fit of the disk hubs on the shafts than heretofore possible. This close fit minimizes the tilting or canting of the disks on the shaft under the lateral pressure of the belt 14. Even a relatively slight amount of looseness and canting results in wear after long operation, particularly in the region near the inner edge 39 of the disk bearing surface. Under faulty systems of lubrication and after prolonged service, the increased amount of play between the disks and the shafts permits irregular slipping between the belt and the surface of the disks, thus seriously impairing, if not destroying, the value of the speed transmission.

Obviously, the invention is not limited to the details of construction of the illustrative embodiment, nor to the specific mechanism in connection with which the illustrative lubricating system was described; these details may be variously modified. Moreover it is not indispensable that all features of the invention may be used conjointly; they may be employed advantageously in various combinations and sub-combinations.

Having thus described one embodiment of my invention, I claim:

1. In a variable speed transmission the combination comprising a power shaft having a power transmitting element mounted thereon and adjustable longitudinally of the shaft to effect speed variation, a thrust bearing connected with said element and longitudinally movable therewith for effecting said adjustments and for taking the thrust of the element, a lubricant passage connecting said thrust bearing with the sliding bearing surface between said element and said shaft, and a flexible lubricant conduit, one terminal of which is stationary and the other connected to the bearing surface of said thrust bearing, whereby lubricant may be supplied to said thrust bearing and said sliding bearing surface.

2. In a variable speed transmission, the combination comprising driving and driven shafts having power-transmitting elements mounted thereon, bearing members for adjusting said elements, a lever connected with said bearings for effecting relative adjustment thereof, a flexible lubricant conduit leading from the fulcrum of said lever to said bearings, and lubricant ducts leading from said bearings to the shaft bearing surfaces of said elements.

3. In a variable speed transmission, the combination comprising driving and driven shafts having power-transmitting elements mounted thereon, bearing member for adjusting said elements, a lever connected with said bearings for effecting relative adjustment thereof, a protective enclosure surrounding the operating parts of said transmission, a flexible lubricant conduit leading from the fulcrum of said lever to said bearing members, and a lubricant conduit leading from the exterior through said enclosure and connecting with said flexible conduit at the fulcrum of said lever.

4. In a variable speed transmission, the combination comprising driving and driven shafts having power-transmitting elements mounted thereon, bearing members for adjusting said elements, a lever connected with said bearings for effecting relative adjustment thereof, a protective enclosure surrounding the operating parts of said transmission, a flexible lubricant conduit leading from the fulcrum of said lever to said bearing members, a lubricant conduit leading from the exterior through said enclosure connecting with said flexible conduit at the fulcrum of said lever, and lubricant ducts leading from said bearing members to the shaft bearing surfaces of said elements.

5. In a variable speed transmission, the combination comprising a shaft having a power-transmitting element mounted thereon, a thrust bearing associated with said element for adjusting the latter, a lever connected with said bearing for effecting the adjustment, a lubricant conduit leading from the fulcrum of said lever to said bearing, and a lubricant passage leading from said bearing to the shaft bearing surface of said element.

6. In mechanism of the class described, the combination comprising a shaft having a power-transmitting element mounted thereon, a bearing member associated with said element and held against rotation, a lubricant conduit connected with said bearing member and a lubricant passage from said bearing member to the shaft bearing surface of said element, whereby said surface is supplied with lubricant from said conduit.

7. In mechanism of the class described, the combination comprising a shaft having a power-transmitting element mounted thereon, a bearing member associated with said element, a protective enclosure surrounding said transmission, means for supplying lubricant to said bearing member from the exterior of said enclosure, and a lubricant passage in said element leading from said bearing member to the shaft bearing surface of said element, whereby said bearing surface is supplied with lubricant from said bearing member.

8. In a variable speed transmission of the character described the combination comprising a rotary power transmitting member mounted for longitudinal adjustment to effect speed variations, a thrust bearing associated with said member for longitudinally adjusting the latter, a lever pivoted to said thrust bearing and having a relatively stationary fulcrum, for shifting said bearing and member to secure adjustment, and a flexible lubricant tube connected at one end to said bearing and supported at another point to said relatively stationary fulcrum whereby one portion of said tube is relatively stationary irrespective of the adjustment of said bearing, thereby permitting lubricant to be introduced into said tube from a stationary point.

9. In mechanism of the character described, the combination comprising a rotary power transmitting member mounted for relative longitudinal adjustment, a thrust bearing associated with said member for longitudinally adjusting the same, and a flexible lubricant tube for conducting lubricant to said thrust bearing, said tube being connected at one end with said bearing and shiftable therewith and the other end being mounted at a relatively stantionary point, whereby lubricant may be introduced into said bearing from the stationary end of said tube irrespective of the adjusted position of said bearing.

10. In a variable speed transmission, the combination comprising a rotary power shaft having thereon a pair of cone friction discs slidably splined on said shaft and cooperating to effect variations in speed, thrust bearings on the hubs of each of said discs for carrying the longitudinal thrust thereon, a lubricating passage in each of said disc hubs for supplying lubricant to the sliding bearing surface of said disc and shaft and communicating with a passage leading to said thrust bearing and a lubricant supply connection movable with said hub and thrust bearing whereby lubricant may be forced through said connecting passages to supply lubricant to said disc and shaft bearing surfaces and to said thrust bearing.

In testimony whereof, I have signed my name to this specification.

CHARLES H. WILLIAMS.